Aug. 11, 1959 L. B. GOODALL 2,898,723
MULTIPLE BLADED MOWER
Filed June 15, 1956 3 Sheets-Sheet 1

INVENTOR.
LEONARD B. GOODALL
BY
Moore, Hugger, White & Burd
ATTORNEYS

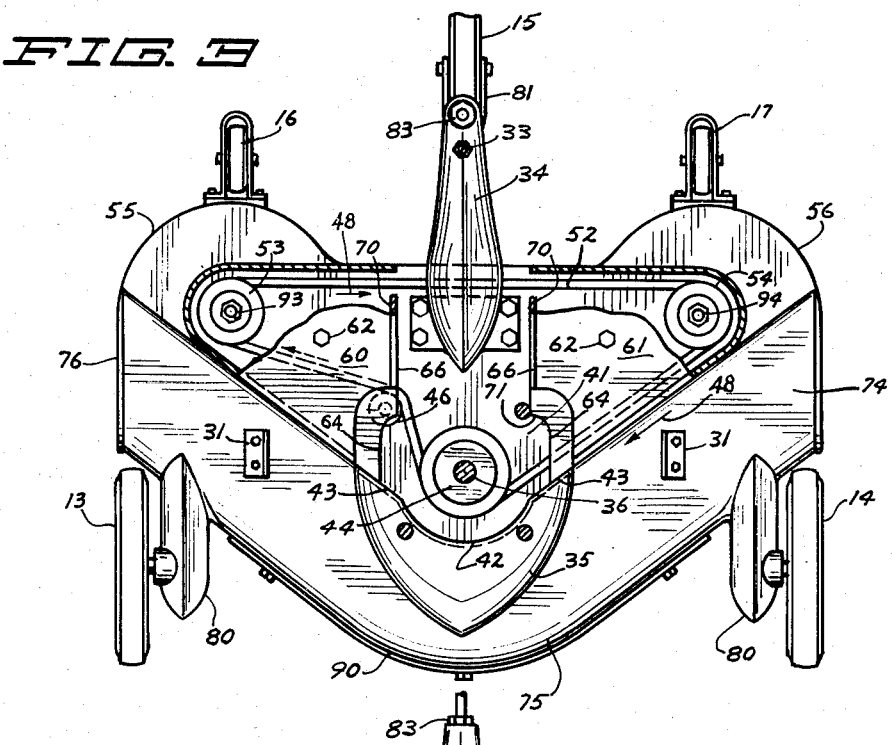
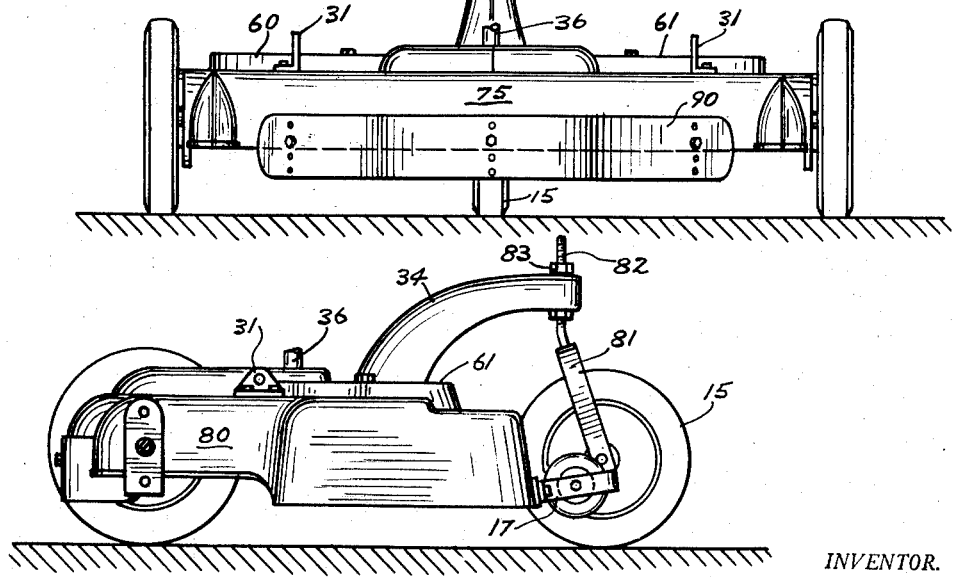
INVENTOR.
LEONARD B. GOODALL
BY Moore, Dugger, White & Burd
ATTORNEYS Aug. 11, 1959  L. B. GOODALL  2,898,723
MULTIPLE BLADED MOWER
Filed June 15, 1956  3 Sheets-Sheet 3

INVENTOR.
LEONARD B. GOODALL
BY
Moore, Hugger, White & Burd
ATTORNEYS

United States Patent Office 2,898,723
Patented Aug. 11, 1959

2,898,723

MULTIPLE BLADED MOWER

Leonard B. Goodall, Warrensburg, Mo., assignor to Goodall Equipment, Inc., Minneapolis, Minn., a corporation of Minnesota Application June 15, 1956, Serial No. 591,703

1 Claim. (Cl. 56—25.4)

This invention relates to a new and useful multiple bladed mower.

Briefly, this mower comprises a new and unique structure in which multiple blades, three in number, are positioned at the apexes of a triangle, with one (preferably larger) blade leading, and two (preferably smaller) blades trailing (in the direction of mowing). The three blades are enclosed in a novel housing having a new and advantageous wheel supporting structure. The three blades are each driven from a prime mover or motor by utilization of a single belt, having a cooperating belt tightener and in cooperation with the new baffle structure of this mower provide a side discharge. The blades are positioned beneath and interior of the housing, the prime mover belt and tightener positioned above and exterior of the housing, the housing provided with cooperating cover members which with the motor provide a substantially complete closure for the belt.

Objects of the present invention are to provide a mower having the foregoing recited features. Other objects of the invention are in the specific structural details thereof. Other objects of the invention are inherent and apparent in the structure as described, pictured and claimed, and will become apparent as the description proceeds.

To the accomplishment of the foregoing and related ends, this invention then comprises the features hereinafter fully described and particularly pointed out in the claim, the following description setting forth in detail certain illustrative embodiments of the invention, these being indicative, however, of but a few of the various ways in which the principles of the invention may be employed.

This invention will be described in more detail with reference to the eight figures of the drawings in which corresponding numerals refer to the same parts and in which:

Figure 3 is a top plan view partially in section, and partially broken away to show the configuration of the housing and the drive means for the instant invention;

Figure 4 is a front elevation of the invention;

Figure 5 is a side elevation thereof;

Figure 1:
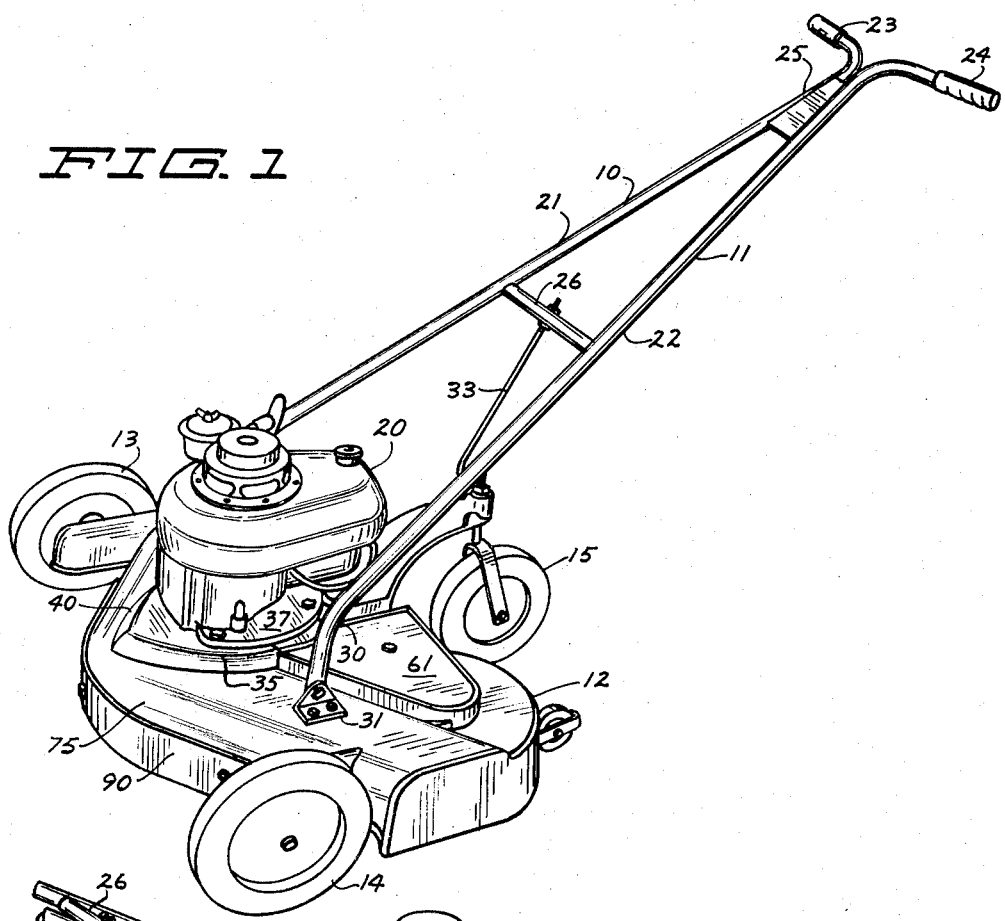
Figure 1 is a front corner perspective view of the instant invention.

In Figure 1 the mower generally designated 10 is shown comprising a handle 11, a housing 12, supporting wheels 13—17 and a prime mover or (in this instance) gasoline motor 20. The handle 11 comprises diverging members 21 and 22 each having a turned handle portion 23 and 24 respectively. The portions 21 and 22 converge at web portion 25 connecting them together at such convergence and are provided with an intermediate bar 26 welded or otherwise secured thereto. The diverging ends of members 21 and 22 are each bent at 30 and bolted to a lug 31 in turn bolted to housing 12. A brace rod 33 penetrates member 26 and is provided with a threaded end secured by nuts thereto and a threaded end secured by nuts to the top surface of housing extension 34, all as shown best in Figures 1 and 2.

Figure 7:
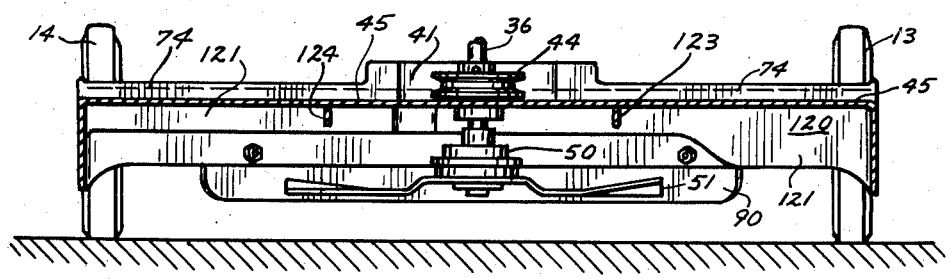
Figure 7 is a vertical sectional view taken along the line and in the direction of the arrows 7—7 of Figure 6 modified to omit the two rearwardly positioned blades.

The motor 20 is suitably bolted to a raised platform 35 of housing 12 and has a shaft 36 penetrating the housing as shown in Figure 7. The platform 35 is in the form of a shield having its pointed end 40 extending in the leading direction of the mower and partially defining a well 41 by rounded trailing edge 42 and inclined edges 43, as best shown in Figure 3.

A drive pulley 44 is secured to shaft 36 in this well 41 and above the top surface 45 of housing 12. The shaft 36 penetrates top surface 45 through a suitable aperture and terminates in a blade holder 50 secured thereto. A blade 51 is bolted or otherwise secured to the blade holder.

Figure 6:
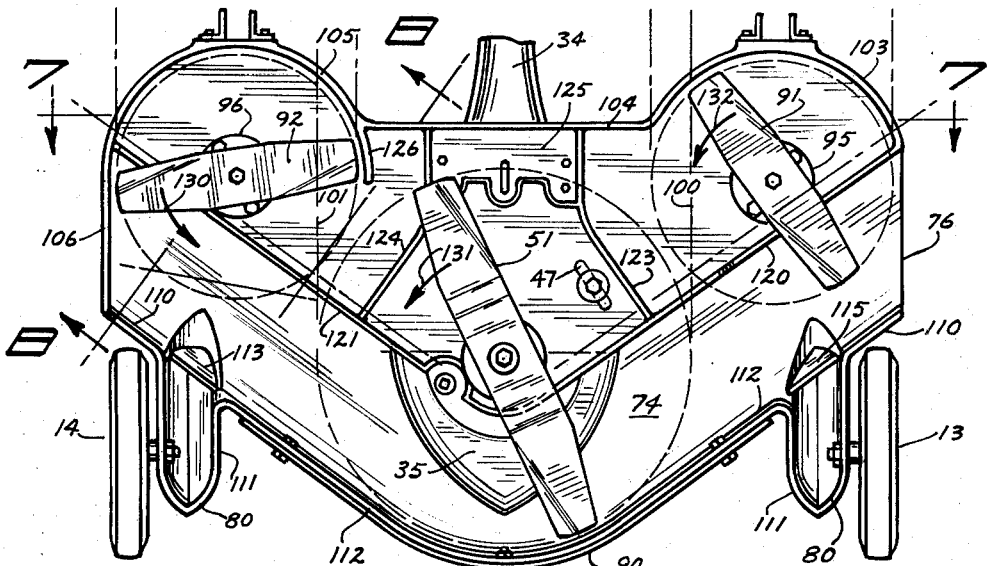
Figure 6 is a bottom plan view thereof.

Around pulley 44 as shown in Figure 3 is passed a belt 52 which is likewise passed around pulleys 53 and 54 which are journalled for rotation in lobate housing portions 55 and 56 respectively. An idler 46 journalled for rotation in an arcuate slot 47 in surface 45 as shown in Figure 6 serves as a belt tightener. It is positioned in engagement with belt 52 after it has engaged pulley 44 and serves to wrap belt 52 around pulley 44 for secure engagement therewith. The belt 52 travels in the direction of arrows 48 and idler 46 is positioned after engagement of belt 52 with pulley 44 so that there is no pull on the idler.

Each of pulleys 53 and 54 is provided with a cover portion 60 and 61 respectively. Covers 60 and 61 are each bolted by a bolt 62 to a housing surface 45, and are placed in spaced relation and in cooperation with the platform portion 35 so that the flange 37 (which partially rests upon portions 64 of members 60 and 61) of the motor 20 together with the top surface of housing 12 and the covers 60 and 61 provide substantially a complete closure for the belt 52. To state this another way, the cover portions 60 and 61 each provide a downwardly dished member of the periphery configuration shown best in Figures 1 and 2 and it is within the downwardly dished configuration that portions of the belt 52 are positioned and belt 52 travels, so that each member 60 and 61 provides a peripheral portion 64 forming a portion of the confine for well 41 and cooperating with portion 43 of shield member 35. Each of the inwardly directed and opposed edges of portions 60 and 61 is provided with a downwardly turned flange 66 which terminates at 70 and 71 to provide openings for the passage of belt 52 during its run.

Figure 2:
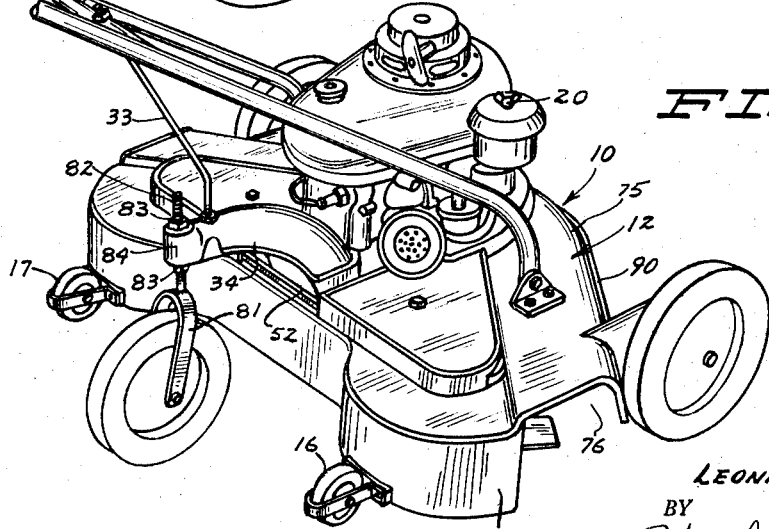
Figure 2 is a rear corner perspective view of the instant invention.

The housing 12 is provided with a forward portion 74 adjacent the leading edge thereof, forming in plan a V with a rounded nose 75 and providing a tubular bulge with an upwardly concave surface in vertical section, which forms a channel at the underside of the housing as later explained. The housing is opened at one side 76 to provide a discharge from the mower as best seen in Figure 2.

The housing 12 is also provided with a pair of forwardly extending outrigger portions 80 to which the wheels 13 and 14 are journalled. It is noted that the wheels 13 and 14 are so positioned that the extension between their outermost peripheries is substantially the same as or less than the width of the housing (Figure 3). The small wheels 16 and 17 are positioned one on either of the lobate portions 55 and 56 and elevated slightly so that normally the mower rests on wheels 13, 14 and 15 and wheels 16 and 17 will engage the supporting surface only when the mower is tilted. Thus, they are normally out of contact with the supporting surface.

The housing extension 34 is bolted to the housing 12 midway between the lobate portions 55 and 56 and is provided with wheel 15 journalled for rotation and to caster therein. Wheel 15 is shown supported by a bifurcated member 81 joined to a spindle 82 in turn positioned by shaft or locating collars 83 with reference to the bearing portion 84 of extension 34.

There is bolted to the front of the housing 12 an elongated extending guard 90 extending between the wheels as shown in Figure 4.

Figure 8:
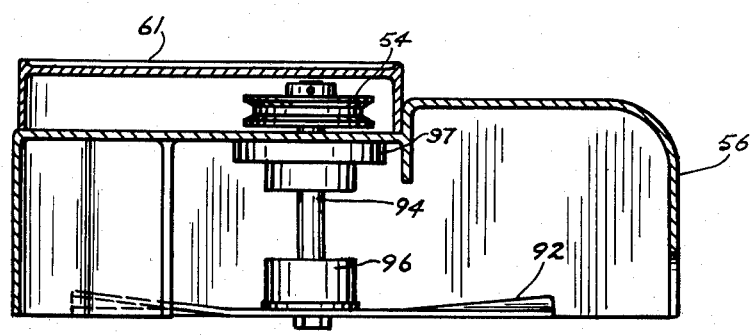
Figure 8 is a vertical sectional view taken along the line and in the direction of the arrows 8—8 of Figure 6.

The underside of the housing 12 is shown best in Figures 6–8.

In these figures, is shown the positioning of the leading blade 51 and the two trailing blades 91 and 92. Blades 91 and 92 are driven by pulleys 53 and 54 respectively which are secured to shafts 93 and 94 which are in turn provided with blade carriers 95 and 96 similar to the carrier 50 for blade 51 to which blades 91 and 92 are respectively bolted. Each of the shafts 93 and 94 is journalled in a bearing 97 secured to the under surface of housing 12.

It will be noted with reference to Figure 6 that the extension of blades 91 and 92 is two-thirds to three-fourths the extension of blade 51 and blades 91 and 92 are positioned perpendicular to and equidistant to a line bisecting the housing from front to rear. The diameter of pulley 44 with relation to that of pulleys 53 and 54 is chosen so that the blade tips of blades 51, 91 and 92 all rotate at substantially the same velocity. Shafts 94 and 93 thus rotate about twenty-five percent faster than shaft 36.

While the cutting circle inscribed by blade 91 is spaced with reference to the cutting circle of blade 51 and the cutting circle of blade 92 is spaced with reference to the cutting circle of 51, a line tangential to the cutting circle of blade 51 and extending from front to rear of the machine in the normal direction of motion thereof, will intersect the cutting circle of blade 91 as shown by line 100. The same is true with respect to the cutting circle of blade 51 and the cutting circle of blade 92 as shown by line 101.

In such fashion housing 12 is provided with a downwardly extending periphery or wall 102 which is opened as explained previously, at 76, has a first lobate portion 103 joined to a linear portion 104 in turn joined to a second lobate portion 105 joined in turn to a side portion 106. Portion 106 is joined to an inclined stub portion 110 joined to the depending wall 111 of outrigger 80 for wheel 14 and then to a portion 112 providing a forwardly rounded nose as shown in Figure 6. The other end of portion 112 is joined to the depending wall 111 of outrigger 80 for wheel 13 and at the other side thereof and extending to discharge opening 76 is an inclined stub portion 110.

There is thus provided a depending vertical wall having an opening 76 at one side thereof and a portion forming a forwardly rounded nose 112 to which the guard 90 is secured.

Plates 113 and 115 for each of outriggers 80 serve to join portions 110 and 112 to provide a substantially continuous forward wall.

Adjacent and inwardly of the wall formed by portions 110, 113, 115 and 112 is the downwardly concave channel 74 elongated and forming a V with a rounded nose as shown in Figure 6. Spaced from wall 110, 113, 115, 112 is a substantially parallel vertical wall 120 having a reduced or shallow portion 121 as shown best in Figure 7. Thus wall 120 provides a deepened portion adjacent blade 91 and a reduced portion adjacent blades 51 and 92.

Baffle stiffening webs 123 and 124 connect portion 120 and 121 and portion 104 as shown in Figure 6 and are joined to a configured boss 125 which supports the extension 34. Adjacent the juncture of wall portion 105 and wall portion 104 is stub wall 126 forming a circular prolongation of wall 105 as shown in Figure 6.

Briefly, the interior of the housing thus provides a peripheral wall having an axial discharge opening 76 with a downwardly turned concave chute forming a forwardly projecting V as it extends from one side to the other side of the housing and formed by walls 120, 121 and 110, 113, 115, 112. The enlarged portion of wall 120 serves to prevent cuttings from being recirculated by blade 91 and guides them out of the discharge chute and the lobate portion 103 for blade 91 guides clippings engaged by the blade. The stub wall 126 prevents build up of clippings and clogging.

Thus, in mowing any clippings from blade 92 will be carried in the direction of the arrow 130 and transferred to the cutting circle of blade 51. They will then be transferred in the direction of the arrow 131 by blade 51 into the cutting circle of blade 91 and will thence be transferred in the direction of the arrow 132 and ejected from the mower.

Thus, the single belt 52 insures that the three blades rotate in the same direction. The staggered blades having cutting circles overlapping as the mower is progressed and the blades being positioned in a triangle with one of the blades leading and two of the blades trailing provides a total cut of grass not possible otherwise. The particular position of the blades in cooperation with the housing and baffles provides a greatly efficient transfer of cuttings from one blade to another and out of the housing. The positioning of the wheels permits extremely close side trim on either side of the mower. The baffles and housing serve to direct the flow of a combined stream of clippings and air.

As many widely differing embodiments of this invention may be made without departing from the spirit and scope thereof, it is to be understood that the specific embodiments described are given by way of example only and the invention is limited only by the terms of the appended claim.

What is claimed:

A multiple blade rotary mower comprising in combination a housing, said housing comprising a downwardly dished member providing a peripheral wall closed except for a discharge opening at one side of the housing, the front of the housing providing a rounded nose wall gradually declining in a horizontal plane to form a V, outrigger portions one on either side of said rounded nose and each having a supporting wheel journalled therein for rotation, each side of said housing providing a linear wall parallel to the direction of motion of the mower terminating in a lobate wall, the other side of each said lobate walls terminating in a common linear wall, one of said linear side walls having a discharge opening therein, a third supporting wheel secured to said housing and adjacent said common linear wall and between said lobate walls and pivoted for rotation about a vertical axis, smaller wheels positioned one on either one of said lobate walls, three blades positioned for rotation within said housing, one providing a leading blade and having a rotating periphery positioned in slightly spaced relation to said forwardly directed nose, two smaller blades, each having a rotating periphery positioned in slightly spaced relation from one of said lobate walls, a baffle portion providing a partial continuation of one of said lobate walls extending slightly inwardly to the juncture of said common linear wall and said lobate wall, a second baffle providing a channel adjacent and following the contour of said forwardly extending nose of said housing and extending from one of said side linear walls to said opening at the other side linear wall and in cooperation with said forwardly extending nose wall forming a downwardly dished elongated confine of V shape terminating in said opening, said baffle having a height dimension substantially the height dimension of said forward wall adjacent said opening and having a dimension substantially less than that throughout the rest of its extension.

References Cited in the file of this patent

UNITED STATES PATENTS

| | | |
|---|---|---|
| 2,114,096 | Noel | Apr. 12, 1938 |
| 2,134,115 | Flammang | Oct. 25, 1938 |
| 2,539,934 | Smith et al. | Jan. 30, 1951 |
| 2,719,396 | Morris et al. | Oct. 4, 1955 |
| 2,743,567 | Martin | May 1, 1956 |
| 2,763,116 | Flinchbaugh et al. | Sept. 18, 1956 |
| 2,801,510 | Colburn | Aug. 6, 1957 |
| 2,809,389 | Collins et al. | Oct. 15, 1957 |
| 2,809,488 | Sewell | Oct. 15, 1957 |
| 2,815,634 | Bush | Dec. 10, 1957 |
| 2,816,410 | Nobles | Dec. 17, 1957 |